United States Patent
Kwak et al.

(10) Patent No.: US 12,484,221 B2
(45) Date of Patent: Nov. 25, 2025

(54) SEMICONDUCTOR DEVICE HAVING CHANNEL ISOLATION STRUCTURE

(71) Applicant: SK hynix Inc., Icheon-si (KR)

(72) Inventors: Dong Hun Kwak, Icheon-si (KR); Moon Soo Sung, Icheon-si (KR); Sung Lae Oh, Icheon-si (KR); Woo Pyo Jeong, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 212 days.

(21) Appl. No.: 18/326,590

(22) Filed: May 31, 2023

(65) Prior Publication Data

US 2024/0260264 A1 Aug. 1, 2024

(30) Foreign Application Priority Data

Jan. 27, 2023 (KR) .................. 10-2023-0010490

(51) Int. Cl.
*H10B 41/27* (2023.01)
*G11C 16/04* (2006.01)
*G11C 16/24* (2006.01)
*H10B 41/35* (2023.01)
*H10B 43/27* (2023.01)
*H10B 43/35* (2023.01)

(52) U.S. Cl.
CPC ......... *H10B 43/27* (2023.02); *G11C 16/0483* (2013.01); *G11C 16/24* (2013.01); *H10B 41/27* (2023.02); *H10B 41/35* (2023.02); *H10B 43/35* (2023.02)

(58) Field of Classification Search
CPC ........ H10B 43/27; H10B 43/35; H10B 41/35; H10B 41/27; G11C 16/0483; G11C 16/24
See application file for complete search history.

(56) References Cited

U.S. PATENT DOCUMENTS

| 8,891,303 | B1 | 11/2014 | Higgins et al. | |
| 8,964,474 | B2* | 2/2015 | Morooka | G11C 16/3427 365/185.17 |
| 10,748,927 | B1 | 8/2020 | Tsutsumi et al. | |
| 2011/0286283 | A1* | 11/2011 | Lung | G11C 16/0483 438/257 |
| 2020/0203427 | A1* | 6/2020 | Noh | H10B 63/84 |
| 2021/0304831 | A1* | 9/2021 | Lee | G11C 16/3445 |

FOREIGN PATENT DOCUMENTS

KR 102295528 B1 8/2021

\* cited by examiner

*Primary Examiner* — Min Huang
(74) *Attorney, Agent, or Firm* — WILLIAM PARK AND ASSOCIATES LTD.

(57) ABSTRACT

A semiconductor device includes a gate structure including a first select line, a second select line, a first wordline, a second wordline, and a third select line. The semiconductor device also includes a first channel layer passing through the second wordline and the third select line. The semiconductor device further includes a second channel layer passing through the first wordline and the first select line, the second channel layer connected to the first channel layer, and a third channel layer passing through the first wordline and the second select line, the third channel layer connected to the first channel layer. The semiconductor device additionally includes an isolation structure that isolates the second channel layer from the third channel layer.

18 Claims, 6 Drawing Sheets

SEMICONDUCTOR DEVICE HAVING CHANNEL ISOLATION STRUCTURE

CROSS-REFERENCE TO RELATED APPLICATION

This application claims priority under 35 U.S.C. § 119(a) to Korean Patent Application No. 10-2023-0010490 filed on Jan. 27, 2023, in the Korean Intellectual Property Office, which is incorporated herein by reference in its entirety.

BACKGROUND

1. Technical Field

Embodiments of the present disclosure relate to an electronic device, and more particularly, to a semiconductor device.

2. Related Art

The degree of integration of a semiconductor device is mainly determined by an area occupied by a unit memory cell. Recently, as the improvement in the degree of integration of a semiconductor device for forming memory cells in a single layer on a substrate reaches a limit, a three-dimensional semiconductor device for stacking memory cells on a substrate has been proposed. Furthermore, to improve the operational reliability of such a semiconductor device, various structures and manufacturing methods have been developed.

SUMMARY

In an embodiment, a semiconductor device may include: a gate structure including a first select line, a second select line, a first wordline, a second wordline, and a third select line; a first channel layer passing through the second wordline and the third select line; a second channel layer passing through the first wordline and the first select line, the second channel layer connected to the first channel layer; a third channel layer passing through the first wordline and the second select line, the third channel layer connected to the first channel layer; and an isolation structure that isolates the second channel layer from the third channel layer.

In an embodiment, a semiconductor device may include: a first sub-memory string including a plurality of first memory cells, the first sub-memory string connected between a source line and a first node; a second sub-memory string including a plurality of second memory cells, the second sub-memory string connected between the first node and a bitline; and a third sub-memory string including a plurality of third memory cells, the third sub-memory string connected in parallel with the second sub-memory string between the first node and the bitline.

DETAILED DESCRIPTION

Various embodiments are directed to improving the structure and operational reliability of a semiconductor device.

It is possible to efficiently improve the structure of a semiconductor device and improve the operational reliability thereof.

Hereafter, embodiments in accordance with the technical spirit of the present disclosure will be described with reference to the accompanying drawings.

Figure 1:
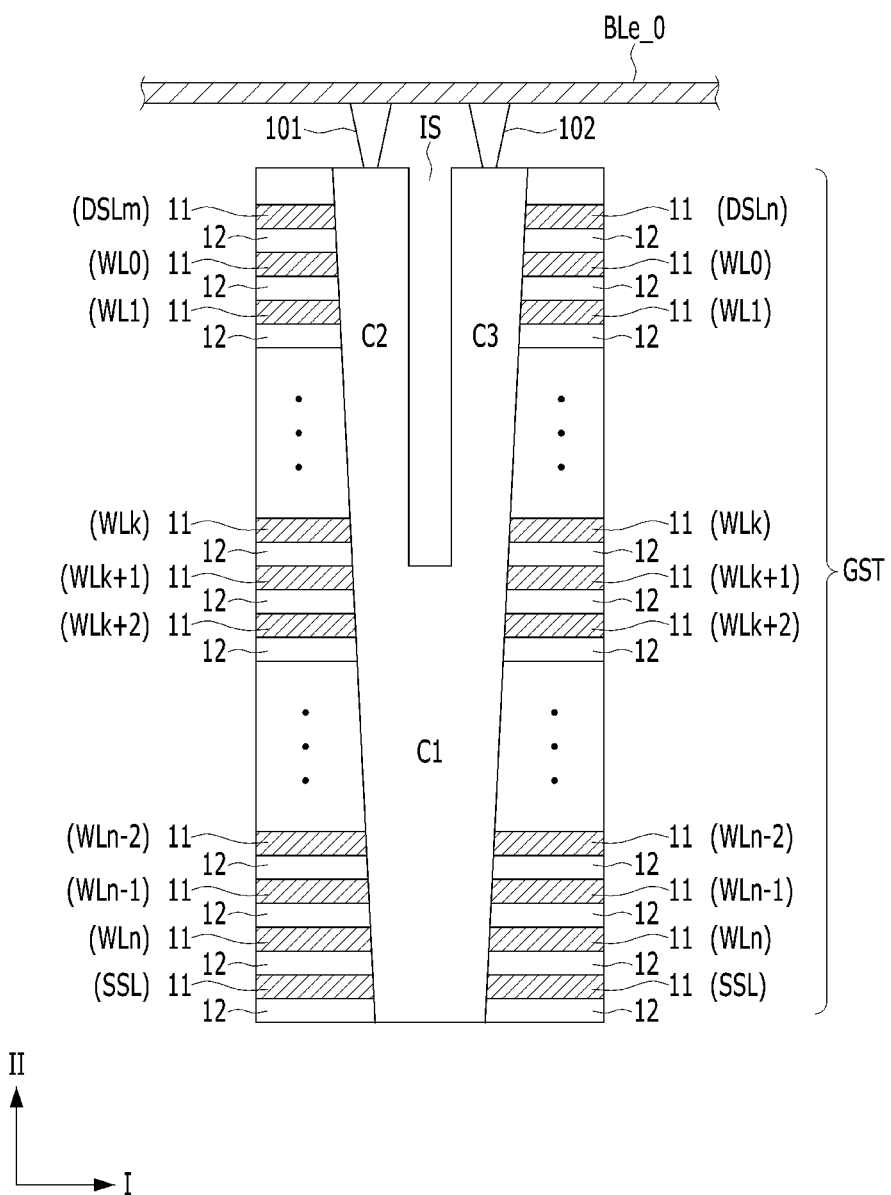
FIG. 1 and FIG. 2 are diagrams illustrating the structure of a semiconductor device in accordance with an embodiment.
Figure 2:
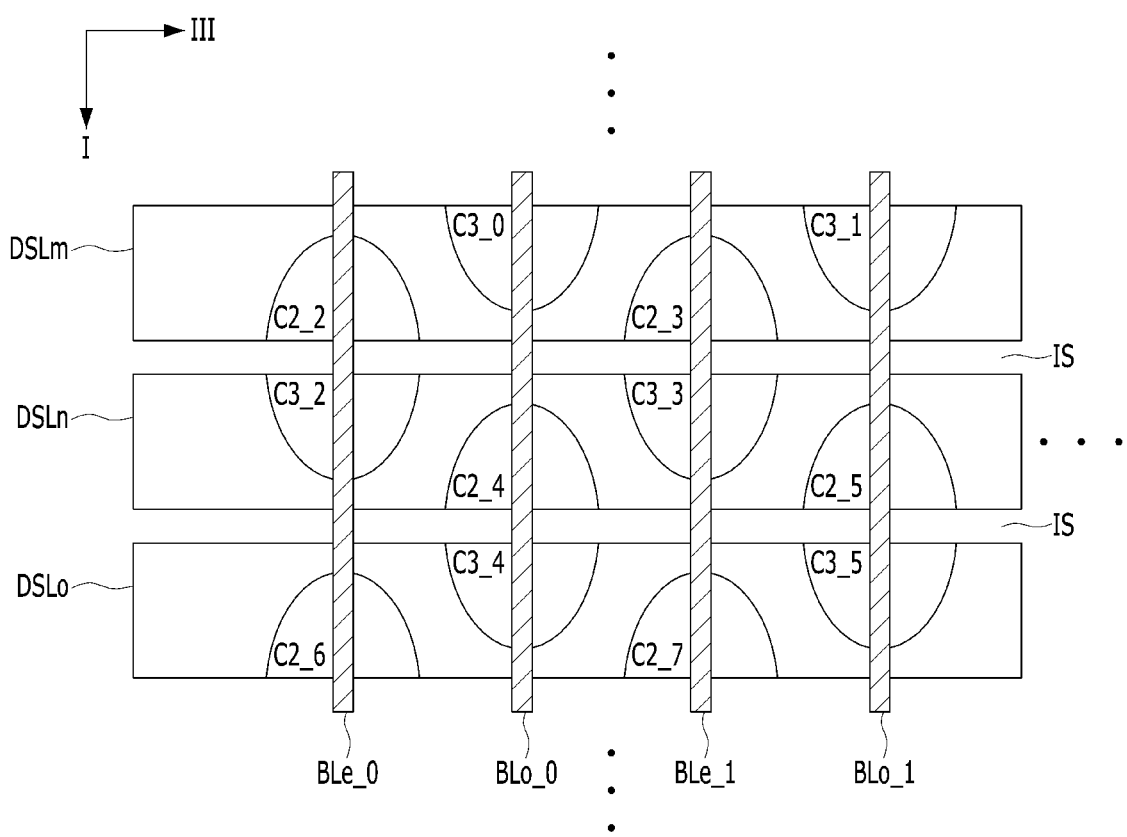

FIG. 1 and FIG. 2 are diagrams illustrating the structure of a semiconductor device in accordance with an embodiment.

Referring to FIG. 1, the semiconductor device may include a gate structure GST, a first channel layer C1, a second channel layer C2, a third channel layer C3, an isolation structure IS, contact plugs 101 and 102, and a bitline BLe_0.

The gate structure GST may include conductive layers 11 and insulating layers 12 that are alternately stacked. The conductive layers 11 may be gate lines such as wordlines WL and select lines DSL and SSL. As an example, at least one lowermost conductive layer 11 among the conductive layers 11 may be a source select line SSL, at least one uppermost conductive layer 11 may be a drain select line DSL, and the remaining conductive layers 11 may be wordlines. In the source select lines SSL and the wordlines WL, lines of the same layer may be the same lines. However, drain select lines DSL may be lines in which a drain select line DSLm on the left side of the drawing and a drain select line DSLn on the right side of the drawing are electrically isolated from each other.

The first channel layer C1, the second channel layer C2, and the third channel layer C3 may be located in the gate structure GST. The channel layers C1 to C3 may be formed by isolating one channel hole. An upper end of the channel hole may be isolated by the isolation structure IS to form the second channel layer C2 and the third channel layer C3 that are electrically isolated, and a lower end of the channel hole may be the first channel layer C1 not isolated by the isolation structure IS. In an etching process for forming a vertical channel hole, the channel hole inevitably becomes narrower downward in the etching direction, wherein the wide upper end of the channel hole may be isolated by the isolation structure IS to form two channel layers C2 and C3 and the narrow lower end of the channel hole may form one channel layer C1 without being isolated. The second channel layer C2 and the third channel layer C3 may be separately formed by the isolation structure IS and connected in parallel between the first channel layer C1 and the bitline BLe_0.

At least one source select transistor and a plurality of first memory cells may be stacked along the first channel layer C1. The source select transistor and the first memory cells may form a first sub-memory string.

A plurality of second memory cells and at least one first drain select transistor may be stacked along the second channel layer C2. The second memory cells and the first drain select transistor may form a second sub-memory string.

A plurality of third memory cells and at least one second drain select transistor may be stacked along the third channel layer C3. The third memory cells and the second drain select transistor may form a third sub-memory string.

The contact plug 101 may connect the second channel layer C2 to the bitline BLe_0, and the contact plug 102 may connect the third channel layer C3 to the bitline BLe_0.

FIG. 2 is a top view of FIG. 1. Although FIG. 1 illustrates one Y-shaped channel including the first channel layer C1, the second channel layer C2, and the third channel layer C3, FIG. 2 illustrates a plurality of Y-shaped channels. The second channel layer C2 and the third channel layer C3 illustrated in FIG. 1 may be a second channel layer C2_2 and a third channel layer C3_2 in FIG. 2. In FIG. 2, a third direction III may be orthogonal to a plane defined by a first direction I and a second direction II in FIG. 2. As illustrated in FIG. 2, one of the second channel layer C2 and the third channel layer C3 may be located at each intersection between bitlines BL and drain select lines DSL.

Figure 3:
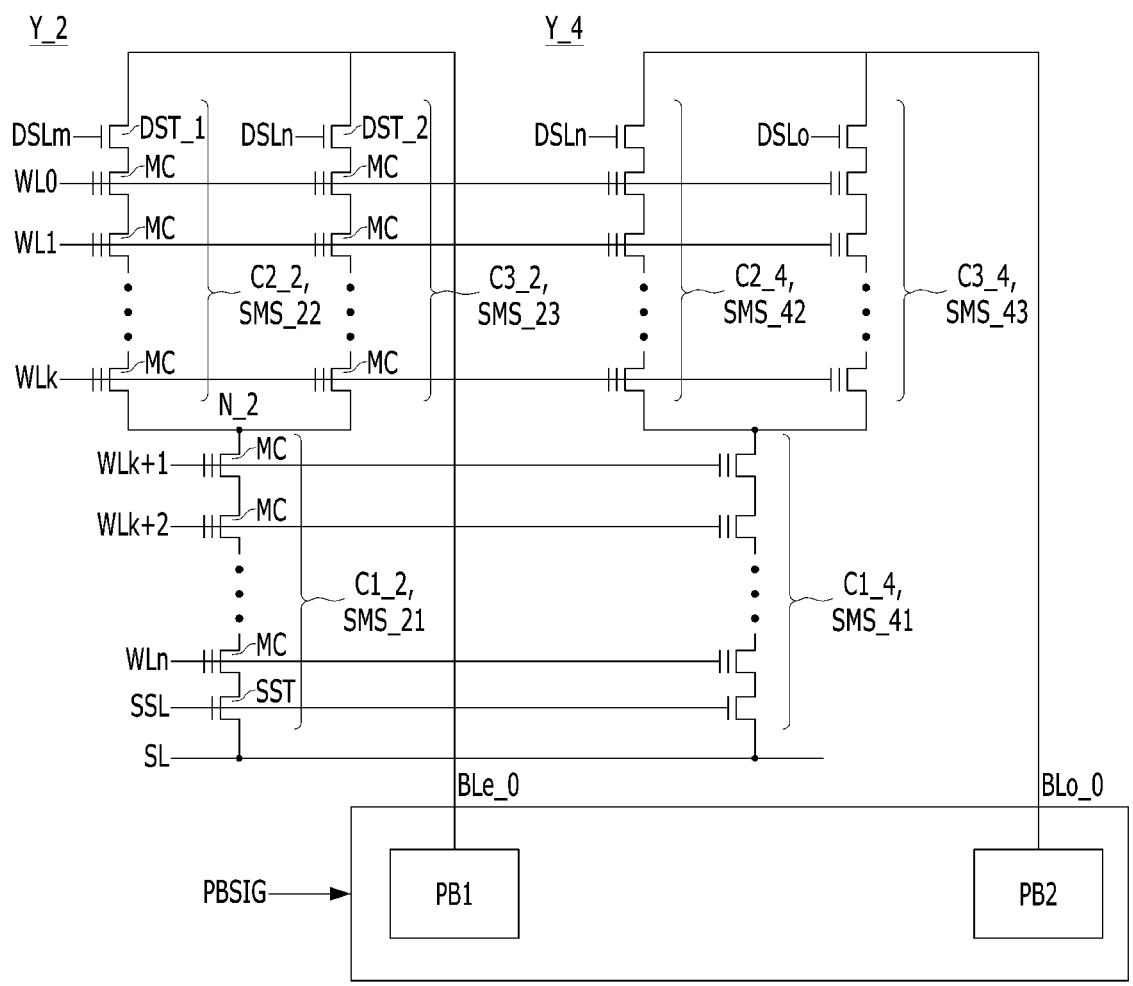
FIG. 3 is a circuit diagram for describing the operation of a semiconductor device in accordance with an embodiment.

FIG. 3 is a circuit diagram for describing the operation of a semiconductor device in accordance with an embodiment. FIG. 3 illustrates a circuit diagram corresponding to a Y-shaped channel Y_2 including the second channel layer C2_2 and the third channel layer C3_2 in FIG. 2 and a Y-shaped channel Y_4 including a second channel layer C2_4 and a third channel layer C3_4.

Referring to FIG. 3, the Y-shaped channel Y_2 may include first sub-memory strings SMS_21 to SMS_23, and the Y-shaped channel Y_4 may include first sub-memory strings SMS_41 to SMS_43.

The first sub-memory string SMS_21 of the Y-shaped channel Y_2 may include memory cells MC and a source select transistor SST connected between a source line SL and a node N_2. The first sub-memory string SMS_21 may correspond to the first channel layer C1 in FIG. 1.

The second sub-memory string SMS_22 of the Y-shaped channel Y_2 may include memory cells MC and a first drain select transistor DST_1 connected between the node N_2 and a bitline BLe_0. The second sub-memory string SMS_22 may correspond to the second channel layer C2 in FIG. 1.

The third sub-memory string SMS_23 of the Y-shaped channel Y_2 may include memory cells MC and a second drain select transistor DST_2 connected between the node N_2 and the bitline BLe_0. The third sub-memory string SMS_23 may correspond to the third channel layer C3 in FIG. 1.

The first to third sub-memory strings SMS_41 to SMS_43 of the Y-shaped channel Y_4 may also have the same configuration as the first to third sub-memory strings SMS_21 to SMS_23 of the Y-shaped channel Y_2.

Hereinafter, how the memory cells MC of the first to third sub-memory strings SMS_21 to SMS_23 of the Y-shaped channel Y_2 may be accessed will be described.

When one of the memory cells MC of the second sub-memory string SMS_22 is accessed, the first drain select transistor DST_1 and the source select transistor SST may be turned on and the second drain select transistor DST_2 may be turned off under the control of select lines DSLm, DSLn, and SSL. Accordingly, the second sub-memory string SMS_22 may be electrically connected between the source line SL and the bitline BLe_0, and a memory cell selected from the second sub-memory string SMS_22 may be accessed by a page buffer PB1 connected to the bitline BLe_0. That is, a program operation or a read operation may be performed on the memory cell selected from the second sub-memory string SMS_22. During the program operation or the read operation, a program pulse VPGM or a read voltage VREAD may be applied to a wordline (for example, WL0) corresponding to the memory cell selected from the second sub-memory string SMS_22 among wordlines WL0 to WLn, and a pass voltage VPASS for turning on unselected memory cells may be applied to remaining wordlines (for example, WL1 to WLn). In such a case, because the second drain select transistor DST_2 is turned off, the third sub-memory string SMS_23 is not electrically connected between the source line SL and the bitline BLe_0, so that a memory cell of the third sub-memory string SMS_23, which shares the same wordline (for example, WL0) with the memory cell selected from the second sub-memory string SMS_22, might not be accessed.

When one of the memory cells MC of the third sub-memory string SMS_23 is accessed, the second drain select transistor DST_2 and the source select transistor SST may be turned on and the first drain select transistor DST_1 may be turned off under the control of the select lines DSLm, DSLn, and SSL. Accordingly, the third sub-memory string SMS_23 may be electrically connected between the source line SL and the bitline BLe_0, and a memory cell selected from the third sub-memory string SMS_23 may be accessed by the page buffer PB1 connected to the bitline BLe_0. That is, a program operation or a read operation may be performed on the memory cell selected from the third sub-memory string SMS_23. During the program operation or the read operation, the program pulse VPGM or the read voltage VREAD may be applied to a wordline (for example, WL2) corresponding to the memory cell selected from the third sub-memory string SMS_23 among the wordlines WL0 to WLn, and the pass voltage VPASS for turning on unselected memory cells may be applied to remaining wordlines (for example, WL0 and WL1 and WL3 to WLn). In such a case, because the first drain select transistor DST_1 is turned off, the second sub-memory string SMS_22 is not electrically connected between the source line SL and the bitline BLe_0, so that a memory cell of the second sub-memory string SMS_22, which shares the same wordline (for example, WL2) with the memory cell selected from the third sub-memory string SMS_23, might not be accessed.

When one of the memory cells MC of the first sub-memory string SMS_21 is accessed, the source select transistor SST may be turned on and one or more of the first drain select transistor DST_1 and the second drain select transistor DST_2 may be turned on under the control of the select lines DSLm, DSLn, and SSL. Accordingly, the first sub-memory string SMS_21 may be electrically connected between the source line SL and the bitline BLe_0, and a memory cell selected from the first sub-memory string SMS_21 may be accessed by the page buffer PB1 connected to the bitline BLe_0. That is, a program operation or a read operation may be performed on the memory cell selected from the first sub-memory string SMS_21. During the program operation or the read operation, the program pulse VPGM or the read voltage VREAD may be applied to a wordline (for example, WLn−1) corresponding to the memory cell selected from the first sub-memory string SMS_21 among the wordlines WL0 to WLn, and the pass voltage VPASS for turning on unselected memory cells may be applied to remaining wordlines (for example, WL0 to WLn−2 and WLn).

The memory cells MC of the first to third sub-memory strings SMS_41 to SMS_43 of the Y-shaped channel Y_4 may also be accessed in the same way as the memory cells MC of the first to third sub-memory strings SMS_21 to SMS_23 of the Y-shaped channel Y_2. When one of the memory cells of the second sub-memory string SMS_42 is accessed, the drain select transistor of the second sub-memory string SMS_42 and the source select transistor of the first sub-memory string SMS_41 may be turned on and the drain select transistor of the third sub-memory string SMS_43 may be turned off under the control of the select lines DSLn, DSLo, and SSL. Furthermore, when one of the memory cells of the third sub-memory string SMS_43 is accessed, the drain select transistor of the third sub-memory string SMS_43 and the source select transistor of the first sub-memory string SMS_41 may be turned on and the drain select transistor of the second sub-memory string SMS_42 may be turned off under the control of the select lines DSLn, DSLo, and SSL. Furthermore, when one of the memory cells of the first sub-memory string SMS_41 is accessed, the source select transistor of the first sub-memory string SMS_41 may be turned on and one or more of the drain select transistor of the second sub-memory string SMS_42 and the drain select transistor of the third sub-memory string SMS_43 may be turned on under the control of the select lines DSLn, DSLo, and SSL.

The memory cells of the first sub-memory strings SMS_21 and SMS_41 are formed as a complete channel hole, and the memory cells of the second sub-memory strings SMS_22 and SMS_42 and the third sub-memory strings SMS_23 and SMS_43 are formed by isolating the channel hole in half. Therefore, however narrow the width of a lower end of the channel hole, the memory cells of the first sub-memory strings SMS_21 and SMS_41 may each have a larger size than the memory cells of the second sub-memory strings SMS_22 and SMS_42 and the third sub-memory strings SMS_23 and SMS_43. Because the size of the memory cell is a very important factor in the characteristics of the memory cell, the number of bits of data stored per memory cell may be different between the memory cells of the first sub-memory strings SMS_21 and SMS_41 and the memory cells of the second sub-memory strings SMS_22 and SMS_42 and the third sub-memory strings SMS_23, SMS_43. For example, in the memory cells of the first sub-memory strings SMS_21 and SMS_41, 3-bit data may be stored per memory cell, and in the memory cells of the second sub-memory strings SMS_22 and SMS_42 and the third sub-memory strings SMS_23 and SMS_43, 2-bit data may be stored per memory cell.

When one of the memory cells of the first sub-memory string SMS_21 of the Y-shaped channel Y_2 is accessed, one or more of the first drain select transistor DST_1 of the second sub-memory string SMS_22 and the second drain select transistor DST_2 of the third sub-memory string SMS_23 may be turned on. Because the number of contacts with the bitline BLe_0 increases when two drain transistors DST_1 and DST_2 are turned on compared to when one drain select transistor (for example, DST_1) is turned on, a larger amount of cell current may flow. To increase the cell current, the first drain select transistor DST_1 and the second drain select transistor DST_2 need to be always turned on during access to one of the memory cells of the first sub-memory string SMS_21, but this is not always possible. For example, when one of the memory cells of the first sub-memory string SMS_21 of the Y-shaped channel Y_2 and one of the memory cells of the first sub-memory string SMS_41 of the Y-shaped channel Y_4 are simultaneously accessed, it might not be possible to supply a turn-on voltage to all the drain select lines DSLm, DSLn, and DSLo. When the turn-on voltage is supplied to all the drain select lines DSLm, DSLn, and DSLo, not only two contacts between the bitline BLe_0 and the Y-shaped channel Y_2 but also a contact between the bitline BLe_0 and a second channel layer (C2_6, see FIG. 2) may be activated, causing a problem that two memory cells are simultaneously connected to one page buffer PB1. Furthermore, not only two contacts between the bitline BLo_0 and the Y-shaped channel Y_4 but also a contact between the bitline BLo_0 and a second channel layer (C2_0, see FIG. 2) may be activated, causing a problem that two memory cells are simultaneously connected to one page buffer PB2. That is, when the memory cells of the first sub-memory strings SMS_21 and SMS_41 are accessed, there may exist a case where two drain select transistors may be turned on and connected to the bitlines BLe_0 and BLo_0, and a case where only one drain select transistor may be turned on and connected to the bitlines BLe_0 and BLo_0.

When the memory cells of the first sub-memory strings SMS_21 and SMS_41 are accessed, the difference in the amount of cell current according to whether one drain select transistor is turned on or two drain select transistors are turned on may be compensated for by adjusting the level of a precharge voltage of the bitlines BLe_0 and BLo_0 or adjusting the length of an evaluation period in which the bitlines BLe_0 and BLo_0 and a sensing node are connected, which will be described below.

Figure 4:
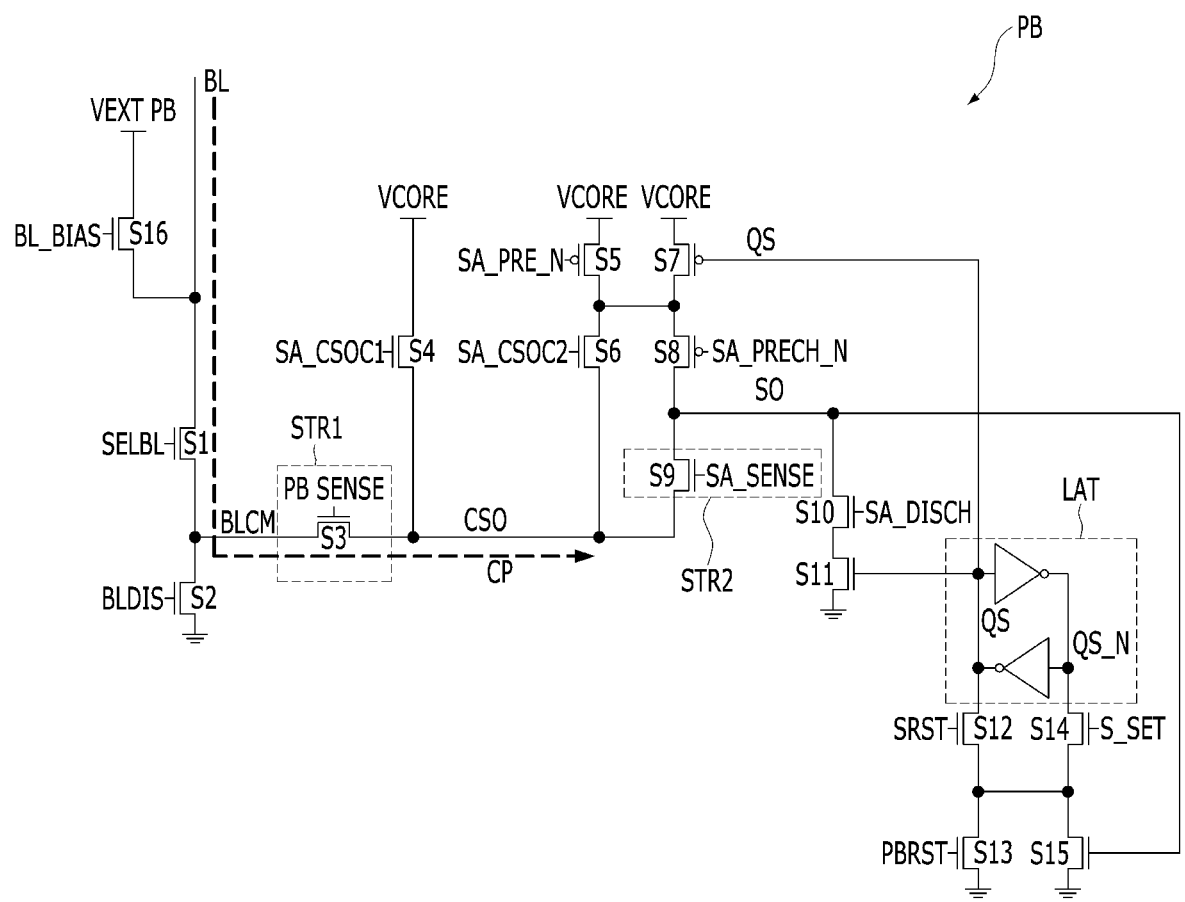
FIG. 4 is a configuration diagram of an embodiment of a page buffer PB in FIG. 3.

FIG. 4 is a configuration diagram of an embodiment of a page buffer PB in FIG. 3. Each of the page buffers PB1 and PB2 in FIG. 3 may be configured as illustrated in FIG. 4. A method capable of compensating for the difference in the amount of cell current according to whether one drain select transistor is turned on or two drain select transistors are turned on during access to the memory cells of the first sub-memory strings SMS_21 and SMS_41 will be described with reference to FIG. 4.

Referring to FIG. 4, the page buffer PB may include first to sixteenth switches S1 to S16 and at least one latch LAT. Each of the switches S1 to S16 may be an NMOS transistor or a PMOS transistor. The latch LAT may include a plurality of inverters. The page buffer PB may include a bitline connection node BLCM, a first sensing node CSO, and a second sensing node SO. Hereinafter, a sensing method of the page buffer will be described based on signals applied to the respective switches S1 to S16.

The first switch S1 may be turned on or off in response to a bitline select signal SELBL. The bitline select signal SELBL may be one of page buffer control signals PBSIG. When the first switch S1 is turned on, a voltage of the bitline connection node BLCM may be transferred to a bitline BL, or a voltage or a current of the bitline BL may be transferred to the bitline connection node BLCM.

The second switch S2 may connect or disconnect the bitline connection node BLCM to/from a ground terminal in response to a bitline discharge signal BLDIS. The bitline discharge signal BLDIS may be one of the page buffer control signals PBSIG. When the second switch S2 is turned on, the bitline connection node BLCM may be connected to the ground terminal and may be discharged.

The third switch S3 may connect or disconnect the bitline connection node BLCM to/from the first sensing node CSO in response to a page buffer sensing signal PBSENSE. The page buffer sensing signal PBSENSE may be one of the page buffer control signals PBSIG. The third switch S3 may be a first sensing transistor STR1. When the first switch S1 and the third switch S3 are turned on, a current path may be formed between the bitline BL and the first sensing node CSO.

The fourth switch S4 may connect or disconnect the first sensing node CSO to/from a core voltage terminal VCORE in response to a first common sensing control signal SA_CSOC1. The fifth switch S5 and the sixth switch S6 may connect the first sensing node CSO and the core voltage terminal VCORE in response to a first precharge signal SA_PRE_N and a second common sensing control signal SA_CSOC2, respectively. The seventh switch S7 may be controlled according to the potential of a first node QS. The eighth switch S8 may be controlled in response to a second precharge signal SA_PRECH_N. The first common sensing control signal SA_CSOC1, the first precharge signal SA_PRE_N, the second common sensing control signal SA_CSOC2, and the second precharge signal SA_PRECH_N may each be one of the page buffer control signals PBSIG.

The ninth switch S9 may be connected between the first sensing node CSO and the second sensing node SO. The ninth switch S9 may connect or disconnect the first sensing node CSO to/from the second sensing node SO in response to a sensing signal SA_SENSE. The ninth switch S9 may be a second sensing transistor STR2. The sensing signal SA_SENSE may be one of the page buffer control signals PBSIG.

The tenth switch S10 may be turned on or off in response to a sensing node discharge signal SA_DIS. The eleventh switch S11 may be turned on or off according to data stored in the first node QS. When the tenth switch S10 and the eleventh switch S11 are turned on, the second sensing node SO may be connected to the ground terminal and may be discharged.

The latch LAT may store data sensed through the bitline BL. Main data may be stored in the first node QS, and inverted data of the main data may be stored in a second node QS_N.

The twelfth switch S12 may be controlled in response to a sensing reset signal SRST. The thirteenth switch S13 may be controlled in response to a page buffer reset signal PBRST. The fourteenth switch S14 may be controlled in response to a sensing setup signal SSET. The fifteenth switch S15 may be controlled in response to a voltage level of the second sensing node SO. The magnitude of the voltage level of the second sensing node SO may vary according to a result of sensing a memory cell.

The sixteenth switch S16 may be controlled in response to a bitline bias signal BL_BIAS. When the sixteenth switch S16 is turned on, an external voltage may be transferred from an external voltage terminal VEXT_PB to the bitline BL.

A sensing operation based on the configuration of the page buffer PB described above is as follows. In a precharge period, the bitline BL may be precharged. A precharge voltage may be the external voltage VEXT_PB or a core voltage VCORE. As an example, the bitline BL may be precharged with the external voltage VEXT_PB by turning on the sixteenth switch S16. In the precharge period, the first sensing node CSO and the second sensing node SO may be precharged. As an example, the first sensing node CSO and the second sensing node SO may be precharged with the core voltage VCORE by turning on the fifth switch S5, the eighth switch S8, and the ninth switch S9.

The voltage level of the external voltage VEXT_PB that may be used for precharging the bitline BL and the voltage level of the core voltage VCORE may be different from each other, and a precharge voltage level of the bitline BL may be adjusted by using this difference. When one drain select transistor is turned on during access to the memory cells of the first sub-memory strings SMS_21 and SMS_41, a higher one of the external voltage VEXT_PB and the core voltage VCORE may be used for precharging of the bitline BL to compensate for the lack of the amount of cell current. Because the amount of cell current is sufficient when two drain select transistors are turned on during access to the memory cells of the first sub-memory strings SMS_21 and SMS_41, a lower one voltage of the external voltage VEXT_PB and the core voltage VCORE may be used for precharging the bitline BL.

In an evaluation period, the bitline BL and the sensing node may be connected in a state in which a read voltage VREAD is applied to a selected wordline and a pass voltage VPASS is applied to unselected wordlines. The bitline BL and the sensing node may be electrically connected by turning on the sensing transistor. As an example, the bitline BL and the first sensing node CSO may be electrically connected by turning on the first sensing transistor STR1. The bitline BL and the second sensing node SO may be electrically connected by turning on the first sensing transistor STR1 and the second sensing transistor STR2.

Through this, a current path CP may be formed between the bitline BL and the sensing node. The resistance of the current path CP may vary according to whether one drain select transistor is turned on or two drain select transistors are turned on during access to the memory cells of the first sub-memory strings SMS_21 and SMS_41. The resistance of the current path CP may be changed by changing the turn-on voltage of at least one of the first sensing transistor STR1 and the second sensing transistor STR2 according to whether one drain select transistor is turned on or two drain select transistors are turned on.

As an example, the level of the page buffer sensing signal PBSENSE applied to the first sensing transistor STR1 may be changed. When one drain select transistor is turned on during access to the memory cells of the first sub-memory strings SMS_21 and SMS_41, a turn-on voltage having a first level may be applied to the first sensing transistor STR1. The resistance of the current path CP may be reduced by increasing the turn-on level of the page buffer sensing signal PBSENSE. Through this, the bitline BL and the first sensing node CSO may be strongly connected, and the flow of current may be increased. That is, the lack of the amount of cell current may be compensated for. When two drain select transistors are turned on during access to the memory cells of the first sub-memory strings SMS_21 and SMS_41, a turn-on voltage having a second level lower than the first level may be applied to the first sensing transistor STR1. The resistance of the current path CP may be increased by decreasing the turn-on level of the page buffer sensing signal PBSENSE. Through this, the bitline BL and the first sensing node CSO may be weakly connected, and the flow of current may be reduced.

As an example, the level of the sensing signal SA_SENSE applied to the second sensing transistor STR2 may be changed. When one drain select transistor is turned on during access to the memory cells of the first sub-memory strings SMS_21 and SMS_41, the turn-on voltage having the first level may be applied to the second sensing transistor STR2. The resistance of the current path CP may be reduced by increasing the turn-on level of the sensing signal SA_SENSE. Through this, the bitline BL and the second sensing node SO may be strongly connected, and the flow of current may be increased. When two drain select transistors are turned on during access to the memory cells of the first sub-memory strings SMS_21 and SMS_41, the turn-on voltage having the second level lower than the first level is applied to the second sensing transistor STR2. The resistance of the current path CP may be increased by decreasing the turn-on level of the sensing signal SA_SENSE. Through this, the bitline BL and the second sensing node SO may be weakly connected, and the flow of current may be reduced.

According to the operation method described above, connection strength between the bitline and the sensing node may be adjusted in the evaluation period according to the number of drain select transistors that are turned on during access to the memory cells of the first sub-memory strings SMS_21 and SMS_41. Accordingly, even though the amount of cell current varies according to a difference in the number of drain select transistors that are turned on, the difference in the amount of cell current may be compensated for by changing the resistance of the current path CP.

Figure 5:
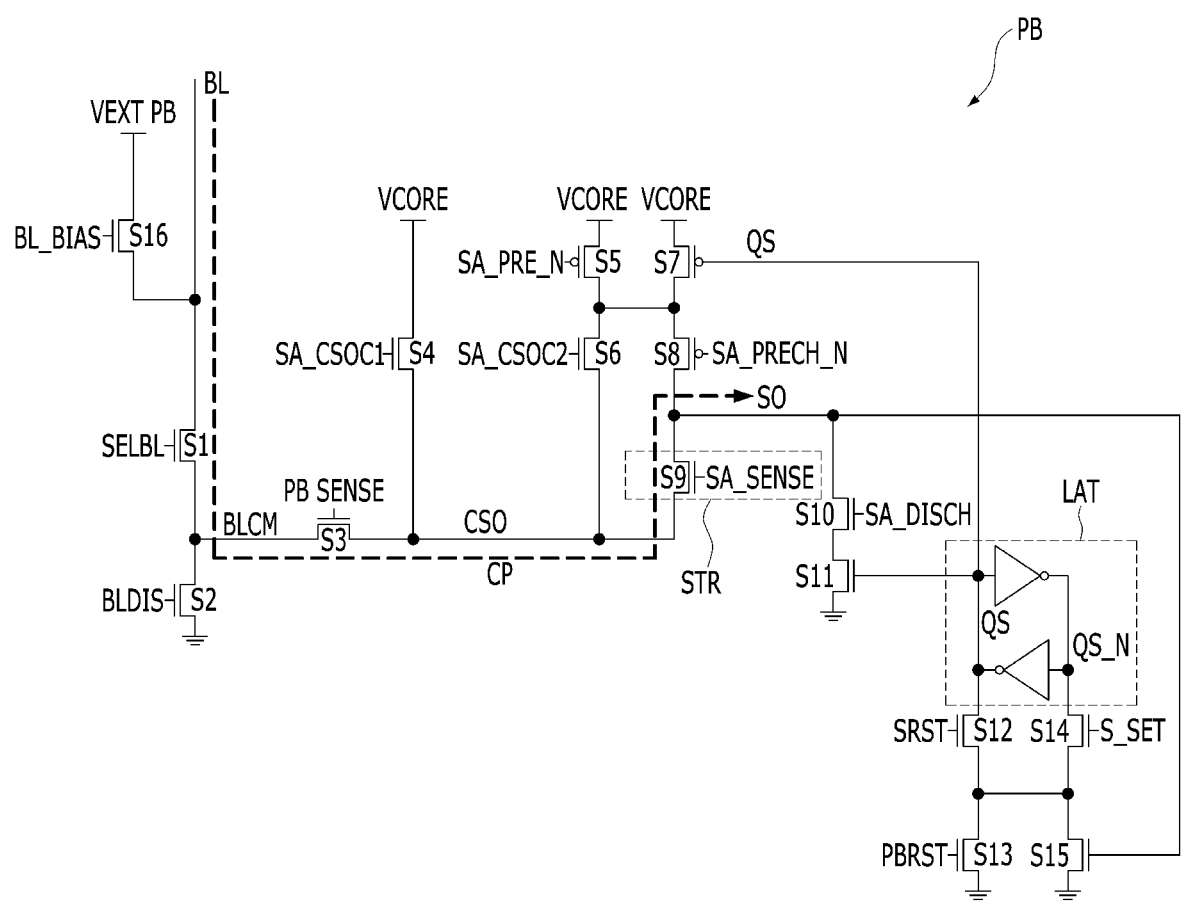
FIG. 5 is a diagram for describing another method for compensating for a difference in the amount of cell current according to whether one drain select transistor is turned on or two drain select transistors are turned on during access to memory cells of first sub-memory strings SMS_21 and SMS_41.

FIG. 5 is a diagram for describing another method for compensating for a difference in the amount of cell current according to whether one drain select transistor is turned on or two drain select transistors are turned on during access to the memory cells of the first sub-memory strings SMS_21 and SMS_41. Hereinafter, the content overlapping with the previously described content will be omitted.

Referring to FIG. 5, a page buffer PB may include the first to sixteenth switches S1 to S16 and at least one latch LAT. The page buffer PB may include the bitline connection node BLCM, the first sensing node CSO, and the second sensing node SO.

In the evaluation period, the bitline BL and the sensing node may be connected in a state in which the read voltage VREAD is applied to a selected wordline and the pass voltage VPASS is applied to unselected wordlines. The ninth switch S9 may be a sensing transistor STR that connects the bitline BL and the sensing node in response to the sensing signal SA_SENSE. As an example, during a read operation, the third switch S3 may be kept turned on, and the ninth switch S9 may be turned on to form a current path CP through which the bitline BL and the second sensing node SO are connected.

The length of the evaluation period may vary according to whether one drain select transistor is turned on or two drain select transistors are turned on during access to the memory cells of the first sub-memory strings SMS_21 and SMS_41. By changing the control method of the sensing transistor STR, the length of the evaluation period may be changed according to the size of a memory string. As an example, the turn-off time point of the sensing transistor STR may be changed according to whether one drain select transistor is turned on or two drain select transistors are turned on during access to the memory cells of the first sub-memory strings SMS_21 and SMS_41. When one drain select transistor is turned on, the evaluation period may have a first length. When two drain select transistors are turned on, the evaluation period may have a second length smaller than the first length.

As an example, when one drain select transistor is turned on, the length of the evaluation period may be increased by delaying the turn-off time point of the sensing transistor STR. When two drain select transistors are turned on, the length of the evaluation period may be reduced by advancing the turn-off time point of the sensing transistor STR.

According to the operation method described above, the length of the evaluation period may be adjusted according to whether one drain select transistor is turned on or two drain select transistors are turned on during access to the memory cells of the first sub-memory strings SMS_21 and SMS_41. Accordingly, even though the amount of cell current varies according to the difference in the number of drain select transistors that are turned on, the difference in the amount of cell current may be compensated for by changing the length of the evaluation period.

Figure 6:
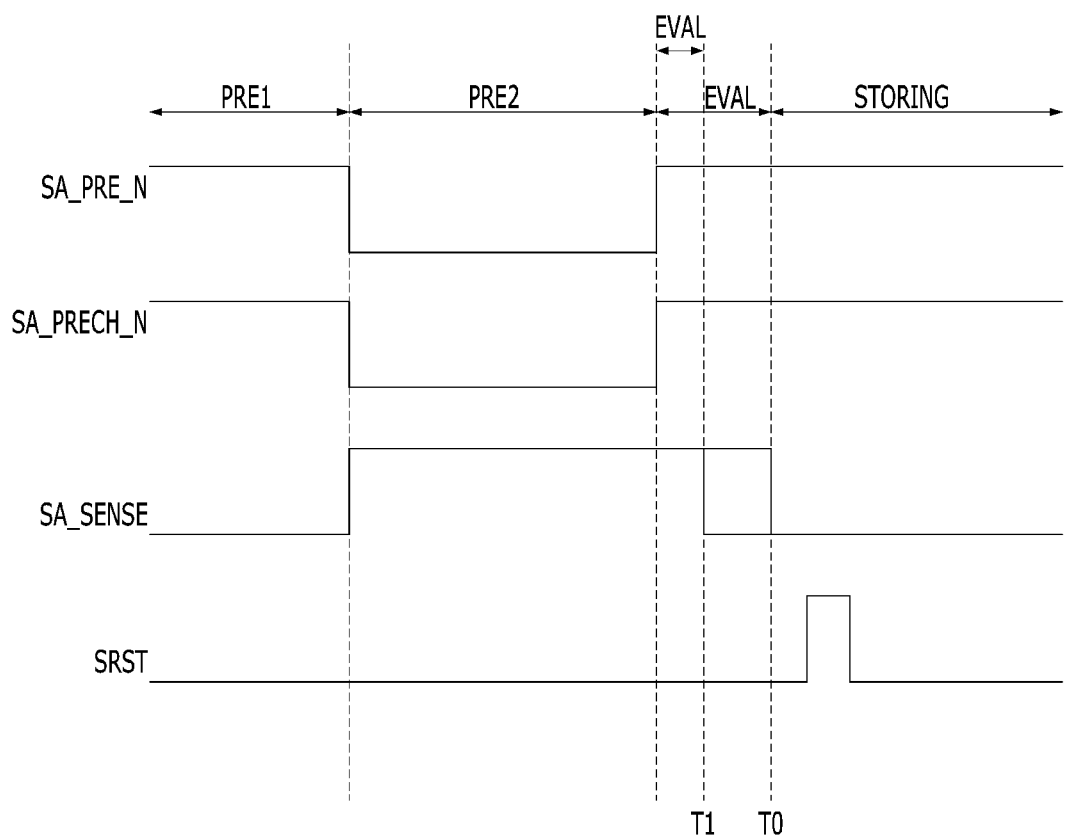
FIG. 6 is a timing diagram for describing an operation of a page buffer PB in FIG. 5.

FIG. 6 is a timing diagram for describing the operation of the page buffer PB in FIG. 5.

Referring to FIG. 5 and FIG. 6, the sensing operation of the page buffer PB may include a first precharge period PRE1, a second precharge period PRE2, an evaluation period EVAL, and a data storage period STORING.

In the first precharge period PRE1, the bitline BL may be precharged. As an example, the first precharge signal SA_PRE_N having a high level may be applied to the fifth switch S5, the second precharge signal SA_PRECH_N having a high level may be applied to the eighth switch S8, and the sensing signal SA_SENSE having a low level may be applied to the ninth switch S9. Through this, the fifth switch S5, the eighth switch S8, and the ninth switch S9 may be turned off. The bitline bias signal BL_BIAS having a high level may be applied to the sixteenth switch S16, and the sixteenth switch S16 may be turned on. Through this, the bitline BL may be precharged with the external voltage VEXT_PB.

In the second precharge period PRE2, the first sensing node CSO and the second sensing node SO may be precharged. As an example, the first precharge signal SA_PRE_N having a low level may be applied to the fifth switch S5, the second precharge signal SA_PRECH_N having a low level may be applied to the eighth switch S8, and the sensing signal SA_SENSE having a high level may be applied to the ninth switch S9. Through this, the fifth switch S5, the eighth switch S8, and the ninth switch S9 may be turned on, and the first sensing node CSO and the second sensing node SO may be precharged with the core voltage VCORE.

In the evaluation period EVAL, the bitline BL and the first sensing node CSO may be connected. As an example, the bitline select signal SELBL having a high level may be applied to the first switch S1 and the page buffer sensing signal PBSENSE having a high level may be applied to the third switch S3. Through this, the first switch S1 and the third switch S3 may be turned on, and the bitline BL and the first sensing node CSO may be connected. As an example, the first precharge signal SA_PRE_N having a high level may be applied to the fifth switch S5, and the second precharge signal SA_PRECH_N having a high level may be applied to the eighth switch S8. Through this, the fifth switch S5 and the eighth switch S8 may be turned off. The sensing signal SA_SENSE having a high level may be applied to the ninth switch S9. Through this, the ninth switch S9 may be turned on, and the first sensing node CSO and the second sensing node SO may be connected. Through this, a current path CP passing through the first switch S1, the third switch S3, and the ninth switch S9 may be formed.

During the evaluation period EVAL, the voltage of the first sensing node CSO may be changed or maintained according to a threshold voltage of a memory cell connected to the bitline BL. When the threshold voltage of the memory cell is lower than the read voltage VREAD, the memory cell may be turned on, and a current path CP through the bitline BL may be formed, so that the voltage of the second sensing node SO may be reduced. When the threshold voltage of the memory cell is higher than the read voltage VREAD, the memory cell may be turned off, no current path CP through the bitline BL may be formed, and the voltage of the second sensing node SO may be maintained. When the sensing signal SA_SENSE having a high level transitions to a low level, the sensing transistor STR may be turned off and the evaluation period EVL may end.

The length of the evaluation period EVAL may be changed according to whether one drain select transistor is turned on or two drain select transistors are turned on during access to the memory cells of the first sub-memory strings SMS_21 and SMS_41. When one drain select transistor is turned on, the length of the evaluation period EVAL may be increased so that the current path CP through the bitline BL may be formed for a sufficiently long time. In such a case, the sensing transistor STR may be turned off at a first time point T0. When two drain select transistors are turned on, the length of the evaluation period EVAL may be increased so that the amount of current flowing through the current path CP is reduced. The sensing transistor STR may be turned off at a second time point T1 earlier than the first time point T0. By advancing the turn-off time point, the length of the evaluation period EVAL may be reduced and the flow of current may be reduced.

In the data storage period STORING, a result of sensing the memory cell may be stored in the latch LAT. The voltage level of the second sensing node SO may be maintained or lowered according to the voltage level of the memory cell connected to the bitline BL. The fifteenth switch S15 may be turned on or off in response to the voltage level of the second sensing node SO. The twelfth switch S12 may be controlled in response to the sensing reset signal SRST. When the twelfth switch S12 and the fifteenth switch S15 are turned on, a current path CP may be formed to the ground, so that the value of the first node QS may be inverted. Accordingly, the second node QS_N may also be inverted.

According to the operation as described above, the length of the evaluation period may be changed according to whether one drain select transistor is turned on or two drain select transistors are turned on during access to the memory cells of the first sub-memory strings SMS_21 and SMS_41. When one drain select transistor is turned on, the sensing transistor STR may be turned off at the first time point T0, and when two drain select transistors are turned on, the sensing transistor STR may be turned off at the second time point T1 earlier than the first time point T0. Accordingly, even though the amount of cell current varies according to the difference in the number of drain select transistors that are turned on, the difference in the amount of cell current may be compensated for by changing the length of the evaluation period, thereby making it possible to improve the sensing operation of the page buffer PB.

Although embodiments according to the technical idea of the present disclosure have been described above with reference to the accompanying drawings, this is only for explaining the embodiments according to the concept of the present disclosure, and the present disclosure is not limited to the above embodiments. Various types of substitutions, modifications, and changes for the embodiments may be made by those skilled in the art, to which the present disclosure pertains, without departing from the technical idea of the present disclosure defined in the following claims, and it should be construed that these substitutions, modifications, and changes belong to the scope of the present disclosure.

What is claimed is:

1. A semiconductor device comprising:
    a gate structure including a first select line, a second select line, a first wordline, a second wordline, and a third select line;
    a first channel layer passing through the second wordline and the third select line at a first level;
    a second channel layer passing through the first wordline and the first select line at a second level, the second channel layer connected to the first channel layer;
    a third channel layer passing through the first wordline and the second select line at the second level, the third channel layer connected to the first channel layer; and
    an isolation structure that isolates the second channel layer from the third channel layer,
    wherein a number of channel layers at the second level is greater than a number of channel layers at the first level.

2. The semiconductor device of claim 1, wherein the second channel layer and the third channel layer are connected in parallel between the first channel layer and a bitline.

3. The semiconductor device of claim 2, wherein a plurality of first memory cells stacked along the first channel layer, a plurality of second memory cells stacked along the second channel layer, and a plurality of third memory cells stacked along the third channel layer constitute one memory string.

4. The semiconductor device of claim 3, wherein each of the plurality of first memory cells have a larger size than each of the plurality of second memory cells and each of the plurality of third memory cells.

5. The semiconductor device of claim 3, wherein, when one of the plurality of second memory cells is selected:
    the first channel layer and a source line are electrically connected to each other;
    the second channel layer and the bitline are electrically connected to each other; and
    the third channel layer and the bitline are electrically isolated from each other.

6. The semiconductor device of claim 3, wherein, when one of the plurality of third memory cells is selected:
    the first channel layer and a source line are electrically connected to each other;
    the third channel layer and the bitline are electrically connected to each other; and
    the second channel layer and the bitline are electrically isolated from each other.

7. The semiconductor device of claim 3, wherein, when one of the plurality of first memory cells is selected:
    the first channel layer and a source line are electrically connected to each other; and
    at least one of the second channel layer and the third channel layer are electrically connected to the bitline.

8. A semiconductor device comprising:
    a first sub-memory string including a plurality of first memory cells, the first sub-memory string connected between a source line and a first node;
    a second sub-memory string including a plurality of second memory cells, the second sub-memory string connected between the first node and a bitline; and
    a third sub-memory string including a plurality of third memory cells, the third sub-memory string connected in parallel with the second sub-memory string between the first node and the bitline.

9. The semiconductor device of claim 8, wherein:
    the first sub-memory string further includes a first select transistor for controlling an electrical connection between the first sub-memory string and the source line;
    the second sub-memory string further includes a second select transistor for controlling an electrical connection between the second sub-memory string and the bitline; and the third sub-memory string further includes a third select transistor for controlling an electrical connection between the third sub-memory string and the bitline.

10. The semiconductor device of claim 9, wherein, when one of the plurality of second memory cells is selected:
the first select transistor and the second select transistor are turned on; and
the third select transistor is turned off.

11. The semiconductor device of claim 9, wherein, when one of the plurality of third memory cells is selected:
the first select transistor and the third select transistor are turned on; and
the second select transistor is turned off.

12. The semiconductor device of claim 9, wherein, when one of the plurality of first memory cells is selected:
the first select transistor is turned on; and
at least one of the second select transistor and the third select transistor are turned on.

13. The semiconductor device of claim 12, wherein at least one of a precharge voltage level of the bitline and a length of an evaluation period is different when one of the plurality of first memory cells is selected and one of the second select transistor and the third select transistor is turned on and when one of the plurality of first memory cells is selected and the second select transistor and the third select transistor are both turned on.

14. The semiconductor device of claim 12, further comprising:
a sensing node; and
a sensing transistor that connects the bitline and the sensing node in response to a sensing signal,
wherein a length of an evaluation period in which the bitline and the sensing node are connected is different when one of the plurality of first memory cells is selected and one of the second select transistor and the third select transistor is turned on and when one of the plurality of first memory cells is selected and the second select transistor and the third select transistor are both turned on.

15. The semiconductor device of claim 12, further comprising:
a sensing node; and
a sensing transistor that connects the bitline and the sensing node in response to a sensing signal,
wherein, during an evaluation period in which the bitline and the sensing node are connected, a resistance value of a current path between the bitline and the sensing node is different when one of the plurality of first memory cells is selected and one of the second select transistor and the third select transistor is turned on and when one of the plurality of first memory cells is selected and the second select transistor and the third select transistor are both turned on.

16. The semiconductor device of claim 8, wherein each of the plurality of first memory cells have a larger size than each of the plurality of second memory cells and each of the plurality of third memory cells.

17. The semiconductor device of claim 8, wherein each of the plurality of first memory cells store data with a larger number of bits than each of the plurality of second memory cells and each of the plurality of third memory cells.

18. The semiconductor device of claim 8, wherein the first sub-memory string, the second sub-memory string and the third sub-memory string are configured to be independently selected and operable, such that a memory operation can be performed via one of the second and third sub-memory strings while the other is electrically isolated.

* * * * *